United States Patent [19]

Rowlett

[11] 4,233,858
[45] Nov. 18, 1980

[54] FLYWHEEL DRIVE SYSTEM HAVING A SPLIT ELECTROMECHANICAL TRANSMISSION

[75] Inventor: Beb H. Rowlett, Rancho Palos Verdes, Calif.

[73] Assignee: The Garrett Corporation, Los Angeles, Calif.

[21] Appl. No.: 754,597

[22] Filed: Dec. 27, 1976

[51] Int. Cl.³ .............. F16H 37/06; B60K 1/00; B60K 41/04

[52] U.S. Cl. .................. 74/675; 74/720.5; 74/752 B; 74/785; 74/857; 74/859; 180/65 A; 290/22; 290/45

[58] Field of Search ......... 74/751, 675, 679, 752 B, 74/785, 788, 720.5, 856, 857, 859; 290/22, 45; 180/65 A

[56] References Cited

U.S. PATENT DOCUMENTS

| | | | |
|---|---|---|---|
| 3,566,717 | 3/1971 | Berman et al. | 74/675 |
| 3,665,788 | 5/1972 | Nyman | 74/675 |
| 3,732,751 | 5/1973 | Berman et al. | 74/675 |
| 3,882,950 | 5/1975 | Strohlein | 74/859 |
| 3,923,115 | 12/1975 | Helling | 180/65 A |
| 4,018,052 | 4/1977 | Laussermair | 74/751 |

FOREIGN PATENT DOCUMENTS 711064  6/1954  United Kingdom ............ 74/675

*Primary Examiner*—Allan D. Herrmann
*Attorney, Agent, or Firm*—Henry M. Bissell

[57] ABSTRACT

A vehicle propulsion system including a split path, electromechanical transmission for use with a flywheel as a power source. One path comprises a mechanical drive train extending between the flywheel power source and the vehicle drive wheels or other power output. The other path comprises an electromechanical drive train of which the mechanical portion is shared with the mechanical drive train by virtue of a common planetary gear arrangement for dividing or combining the power transmitted from or to the flywheel. A battery may be included in the system to make up certain losses from operation and to provide the initial start-up power. A simplified control system is provided to control the transmission of power over the separate parallel paths.

30 Claims, 7 Drawing Figures

FLYWHEEL DRIVE SYSTEM HAVING A SPLIT ELECTROMECHANICAL TRANSMISSION

BACKGROUND OF THE INVENTION

1. Field of the Invention

This invention relates to prime movers such as may be used in vehicle propulsion systems, for example, and more particularly to self-contained prime mover systems employing rotating flywheels for energy storage.

2. Description of the Prior Art

The driving conditions, customs, and practices experienced by the general public place demands upon the power plant of the conventional automobile which render it inherently inefficient. For a long time the driving public, Americans in particular, have opted for larger, heavier automobiles with the capability of operating satisfactorily under low-speed city traffic and high-speed turnpike conditions with a substantial degree of acceleration in all speed ranges. Meeting these demands has resulted in large high-powered engines which are only rarely exercised to full capacity or even operated within their range of most efficient operation. Until recently, the internal combustion engine was the only power plant capable of providing these performance capabilities and automobiles produced for sale to the American public have almost exclusively contained internal combustion engines, predominantly fueled by gasoline.

However, the recent adoption of ever more stringent restrictions on engine exhaust and other emissions has required the emasculation of the performance capabilities of the conventional American automobile engine, and the various pollution control devices which are now required to be combined with such engines have further degraded their performance and exacerbated their inefficiencies. With the current emphasis on goals of pollution-free operation and conservation of energy, it appears that the era of the conventional internal combustion engine as an automobile power plant is nearing an end. Work on other types of propulsion systems will doubtless result in the internal combustion engine being phased out as such alternative systems are developed.

Even before the recent shift in emphasis on design considerations which has militated in favor of less polluting, more fuel-economical propulsion systems, work was done on the development of hybrid power plants for vehicle propulsion and for stationary power sources as well. The objective of such systems was to combine a standard engine or like power source generally sized to the load normally encountered in its use with an auxiliary power source capable of supplying additional power or torque under relatively transient, larger load conditions. One such system is disclosed in the Henry U.S. Pat. No. 707,230 directed to a combination steam engine and electric motor propulsion system for driving an automobile through a planetary gearing mechanism. Another such system utilizing a flywheel in combination with a plurality of electric motors is disclosed in the Thomas U.S. Pat. No. 1,076,614, entitled Winding Apparatus. Other systems utilizing a flywheel for energy storage are disclosed in the Heins U.S. Pat. No. 2,672,566 which combines a flywheel and an electric motor coupled together through a planetary gear system, and the Kasschau U.S. Pat. No. 2,443,770 and the Cuny U.S. Pat. No. 2,567,636, both of which combine a flywheel with an internal combustion engine. Split path, power transmission systems combining an internal combustion engine with an electric drive unit are the subject of the Berman et al U.S. Pat. No. 3,566,717 and an article entitled "An Electromechanical Transmission for Hybrid Vehicle Power Trains—Design and Dynamometer Testing" by Gelb et al, Society of Automotive Engineers (Automotive Engineering Congress, Jan. 11-15, 1971). The Chirgwin U.S. Pat. No. 3,851,232 discloses an electrical propulsion system for rapid transit cars or trains utilizing third rail electric power in combination with an energy storing flywheel during certain modes of operation of the system.

As may be surmised form the variety of combination systems and loads epitomized in the examples referenced above, the demands of different utilization systems dictate different types of power plants. For example, for the purposes of the present invention, a prime mover system such as may be used to provide propulsion for individual vehicles such as personal automobiles or small rail cars, an internal combustion engine is undesirable. The split electromechanical transmission and control system of the present invention is particularly adpated to the use of an energy storing flywheel as a power source.

SUMMARY OF THE INVENTION

In brief, particular arrangements in accordance with the present invention incorporate a flywheel as an energy storage and power source device in conjunction with a split path, electromechanical transmission and control system to transfer energy to and from the drive wheels of a self-propelled vehicle. An electric battery may also be incorporated as an auxiliary energy source.

One preferred embodiment of the invention includes a differential planetary transmission to proportion the power flow between the two transmission paths to accommodate to various operating conditions under the influence of the control system. A first motor-generator (called a generator) is coupled to the planetary ring gear and the planet carrier is connected to an output shaft leading to the vehicle drive wheels (when the system is used for vehicle propulsion), to which shaft a second motor-generator (referred to as the traction motor) is coupled in driving relationship. The flywheel shaft is connected to the sun gear of the differential planetary transmission. A controller and battery are connected between the generator and the traction motor to control the current flow between different pairs of the electrical components—i.e., the battery, the generator and the traction motor. This in turn determines the distribution of torque and power to and from the flywheel between the shaft and electrical output paths under continuously variable output speed conditions. By virtue of the split electromechanical transmission feature wherein a substantial portion of the power from the flywheel to the drive wheels is delivered directly via the mechanical coupling path, the size of the generator and traction motor may be substantially reduced as contrasted with those systems in which all of the power is fed through the electrical path between the generator and the motor, thus minimizing the cost and size of the generator and motor and improving the efficiency of the overall transmission system. The differential planetary transmission and the controller of the present invention accommodate a wide variation in input shaft speed from the flywheel over a range extending from zero to maximum permissible speed (on the order of 25,000 rpm).

Various arrangements of components making up the system of the present invention may be realized. For example, in one preferred embodiment, the traction motor shaft is coupled directly in line with the planetary carrier shaft and the output shaft to the vehicle drive wheels. In another arrangement, the traction motor may be separately coupled to the carrier output shaft via suitable gearing. The generator may be coupled to the planetary ring gear by gearing, belting or chain, or in one particular embodiment, it may be structurally integrated with the planetary gear unit. Where dual axle (four wheel drive) power coupling is desired, the traction motor may be coupled to the front (or rear) wheels of the vehicle apart from the mechanical transmission connection to the other drive wheels of the vehicle. Additional shaft outputs may be provided as desired by utilizing additional traction motors coupled to the controller and the other electrical components of the system.

BRIEF DESCRIPTION OF THE DRAWING

A better understanding of the present invention may be had from a consideration of the following detailed description, taken in conjunction with the accompanying drawing, in which.

DESCRIPTION OF THE PREFERRED EMBODIMENTS

Figure 1:
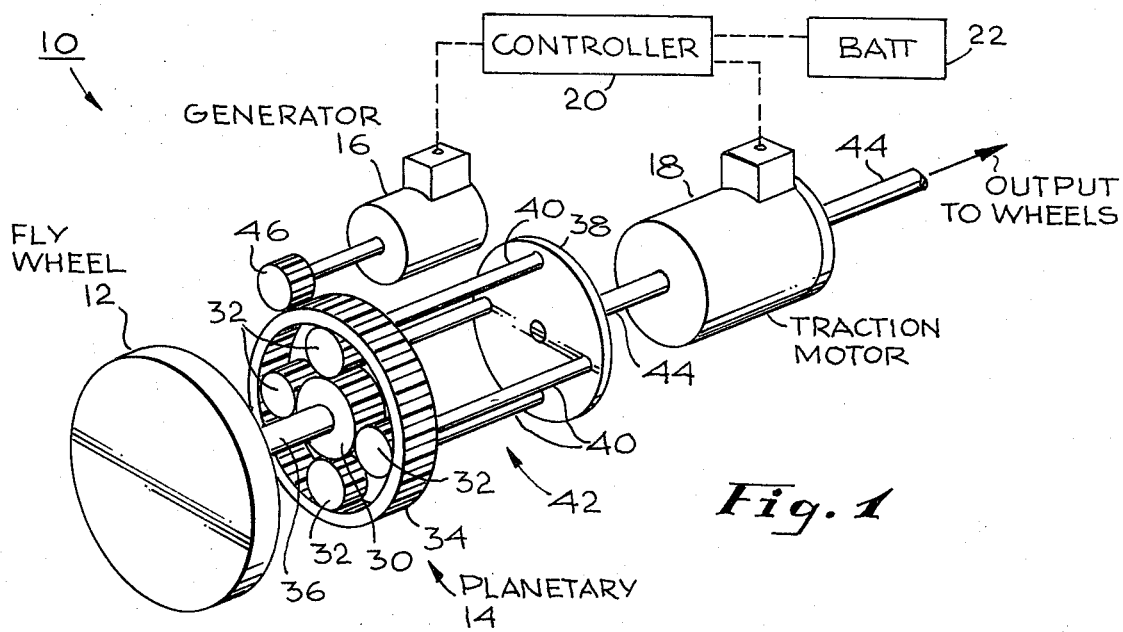
FIG. 1 is a schematic representation of one particular arrangement in accordance with the present invention.

As shown in the schematic diagram of FIG. 1, a propulsion system 10 in accordance with the present invention comprises a flywheel 12, a differential planetary transmission 14, a generator 16, a traction motor 18, a controller 20 and a battery 22. The planetary transmission 14 is shown comprising a sun gear 30, four planetary gears 32 and a ring gear 34. The flywheel 12 is connected to the sun gear 30 by a shaft 36. Each of the planet gears 32 is connected to a carrier plate 38 via a corresponding rod or shaft 40. The planet gears 32 are mounted on the shafts 40 by a bearing arrangement (not shown) to permit relative rotation with respect thereto. The assembly of the planet gears 32, carrier plate 38 and shafts 40 constitutes a carrier 42. An output shaft 44 is secured to the carrier plate 38 and extends through the motor 18 to provide mechanical output from the propulsion system 10, customarily to the drive wheels of a vehicle via a conventional differential gear system. The generator 16 is shown in this embodiment as being coupled to the planetary ring gear 34 by a spur gear 46.

It will be understood that the system of the present invention may be operated without drawing current from the battery for driving the traction motor, in which case the flywheel would be the sole source of energy for propelling the vehicle and the battery would be used only as a source of voltage for the control circuitry. Moreover, arrangements in accordance with the present invention may be put to uses other than as propulsion systems for vehicles, although the examples described herein relate to vehicle propulsion.

As is well known, a differential gear system, such as the differential planetary transmission 14 of FIG. 1, has the ability to alter speed internally with respect to its input and output shafts to maintain optimum power flow under all operating conditions. The differential gear system makes such changes automatically without the need for additional governors or sensing devices. Depending upon external conditions, power may be applied to any one or two of the three elements—sun gear, planet gears and ring gear—making up the differential gear system and may be taken out via the remaining element(s). Another way of looking at it is to consider the differential gear system employed herein as having three terminals: an input, connected to a mechanical power generating component; an output, connected to a power consuming component; and an auxiliary, connected to either a power generating or consuming component to add or subtract power as required. A detailed discussion of such a gear system may be found in an article by Fred A. Shen entitled "Power Flow in a Differential", pp. 77ff, MACHINE DESIGN, Apr. 8, 1976.

Figure 2:
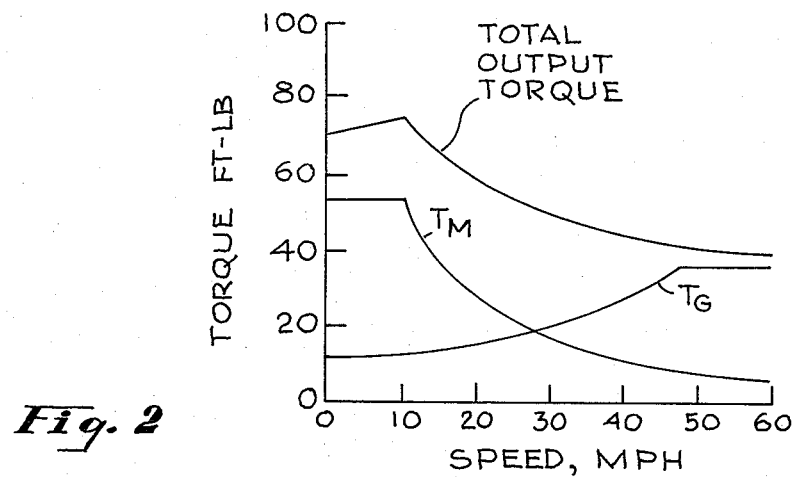
FIG. 2 is a graph of torque output for the arrangement of FIG. 1.

As exemplified in FIG. 1, propulsion systems in accordance with the present invention provide an infinitely variable transmission ratio between the flywheel as the power source and the vehicle drive wheels. Such systems can provide any speed from zero to the maximum speed of the traction motor. The flow of torque or power from the flywheel to the output shaft has two paths in parallel. One of the paths is from the flywheel shaft through the differential to the generator and then, electrically, to the traction motor. The other path is through the differential transmission gears via the planet gear carrier to the output shaft. As shown in FIG. 2, which is a graph of torque in pounds-feet versus speed in miles per hour, the total output torque is the sum of the torque from the traction motor ($T_M$) and the torque from the planet gear carrier ($T_G$) of the planetary gear box. The efficiency of the system is higher than the conventional flywheel drive in which all of the power must pass through both electrical components in series. Also, because the generator and traction motor only transmit a portion of the power, these units can be much smaller than in the conventional case where the generator and motor must transmit all of the power from the flywheel.

Operation of the system is as follows. Initially, at the beginning of the day or after the vehicle has been stopped for an extended period, the flywheel 12 is energized to its maximum speed by using the generator 16 as a motor with the output shaft 44 held stationary. External power is required for this and may be drawn from an external source or from the battery 22 via the controller 20. Thereafter, to accelerate the vehicle, the generator 16 is driven by the flywheel 12 and supplies current to the traction motor 18. The torque for the generator 16 is supplied by the deceleration of the flywheel 12 which also reacts to accelerate the output carrier shaft 44. Thus, the two components of torque developed along the separate paths of the split electromechanical transmission system both originate from the flywheel 12.

Under conditions of deceleration, the flow of power and the direction of torque are the reverse of the acceleration case. The traction motor 18 acts as a generator and the generator 16 acts as a motor to accelerate the flywheel. At the same time a torque component is applied via the carrier 42 along the mechanical torque coupling path and adds to the torque applied to the flywheel 12 from the generator 16. Under these conditions, the flywheel resistive torque is again split between the ring gear 34 and the carrier 42 so that there are two components of torque which act to decelerate the vehicle.

For the simple case shown in FIG. 1, the fraction of the power that is transmitted through the gears varies with the output speed. Initially, the fraction is low but as the speed increases, the fraction approaches 1.0.

Figure 3:
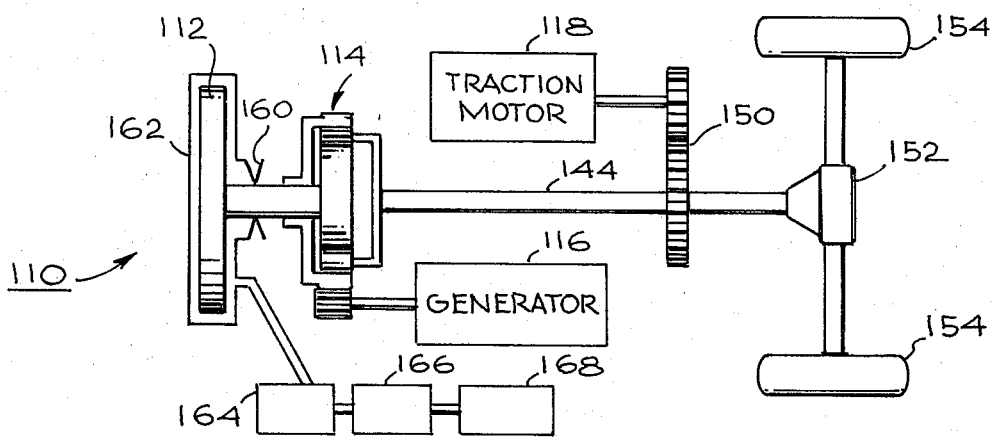
FIG. 3 is a schematic representation of a variation of the arrangement as shown in FIG. 1.

Other gear arrangements may be utilized. FIG. 3 shows such a system in schematic form, the elements thereof corresponding to the arrangement of FIG. 1 having the same reference numerals increased by 100. In FIG. 3, system 110 has its generator 116, planetary gear system 114 and flywheel 112 coupled substantially as shown in FIG. 1 (the controller 20, battery 22 and connections thereto being omitted for simplicity of illustration). However, the traction motor 118 is not mounted directly on the output shaft 144 but instead is coupled thereto by a gearing arrangement 150. This may be a directly coupled gear arrangement or it may comprise gears interconnected through what is referred to as a silent chain drive, or it may utilize any other well-known shaft coupling arrangement. As shown in FIG. 3, the output shaft 144 connects to a differential gear unit within the housing 152 for propelling the vehicle via the drive wheels 154.

The structural details of the flywheel 112 are not a part of the present invention and need not be gone into in depth. Flywheel propulsion systems are currently employed in railcar and bus propulsion systems and are therefore well known in the art. Typically, as indicated in FIG. 3, these flywheels operate in a vacuum environment maintained by a vacuum seal 160 of the housing 162 and a vacuum system which includes a vacuum pump 164, an oil pump 166 and a motor 168. In one particular embodiment of the present invention, a flywheel was employed which had a maximum speed of 25,000 rpm and a total assembly weight, including accessories, of 65 pounds. This flywheel system had a total energy of 1000 watt-hours, with an available energy of 750 watt-hours.

Both the generator and traction motor are motor/generator machines and act as a motor or as a generator depending upon the direction of transfer of power between the output shaft and the flywheel. In a propulsion system embodiment including the flywheel described above, both the generator and the traction motor were identical machines having a rated power of 13.7 hp, a maximum speed of 7000 rpm, a nominal efficiency of 88% and a weight of 80 pounds each. Taken altogether, the propulsion system including these components, together with the gear box and controller but not including the battery pack, weighed 250 pounds. This was installed in a vehicle having a gross weight, battery pack and all, of 3000 pounds.

Figure 4:
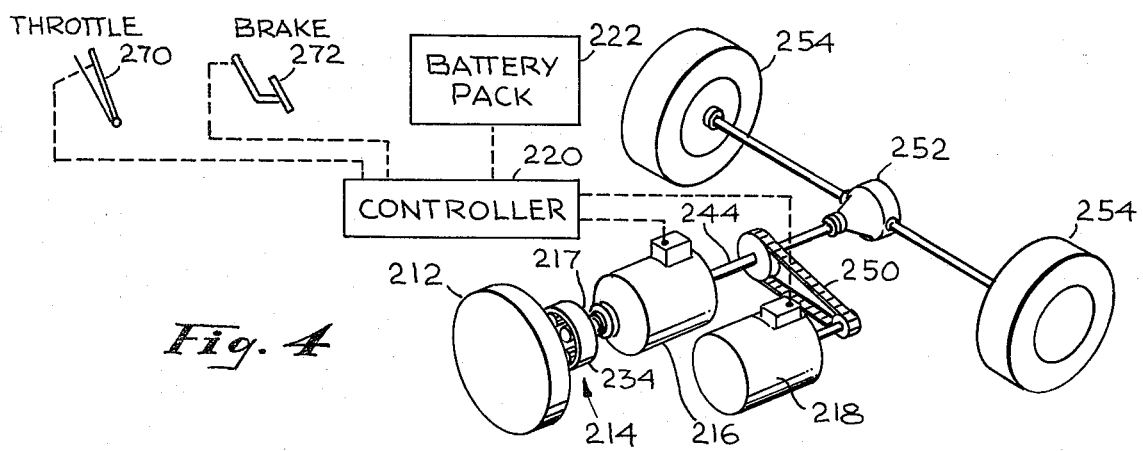
FIG. 4 is a representation of still another arrangement in accordance with the present invention.
Figure 5:
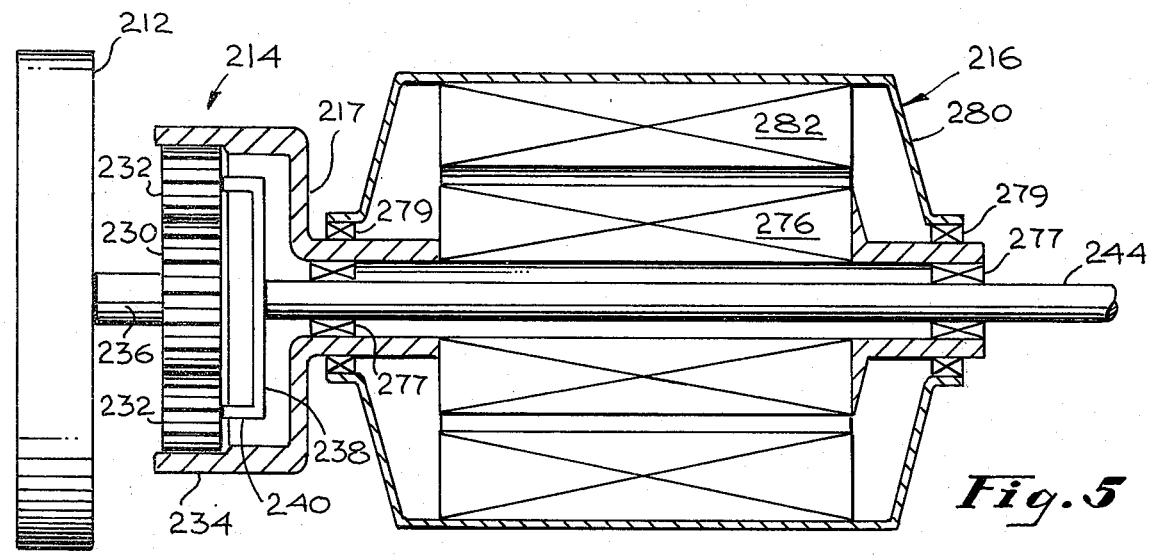
FIG. 5 is a schematic sectional view of a combination generator and planetary gear transmission as may be employed in the arrangement of FIG. 4.

FIG. 4 illustrates a further variation of the arrangement of FIG. 3. In FIG. 4, the traction motor 218 is shown coupled to the drive shaft 244 by a silent chain arrangement 250. The flywheel 212, battery pack 222 and controller 220 are as shown in FIG. 1 with the addition of the indicated throttle 270 and brake 272 inputs to the controller 220. However, the generator 216 is mounted in line with the output shaft 244 and has its armature shaft 217 connected directly to the ring gear 234 of the planetary transmission 214. Further details of the construction of the generator 216 are shown in FIG. 5. The operation of the system of FIG. 4 is essentially as has been described in connection with FIGS. 1 and 3.

As shown in FIG. 5, the flywheel 212 is connected to the sun gear 230 of the differential planetary 214 via shaft 236. Planet gears 232 are mounted on carrier rods 240 extending from the carrier plate 238 which is secured to the output shaft 244 which extends coaxially through the generator 216. The generator armature 276 is mounted so as to rotate relative to the shaft 244 by means of bearings 277 and has a hollow shaft 217 which is connected directly to the planetary ring gear 234. Additional bearings 279 are provided to support the armature 276 relative to the generator housing 280. Field coils 282 are shown in position within the housing 280.

Figure 6:
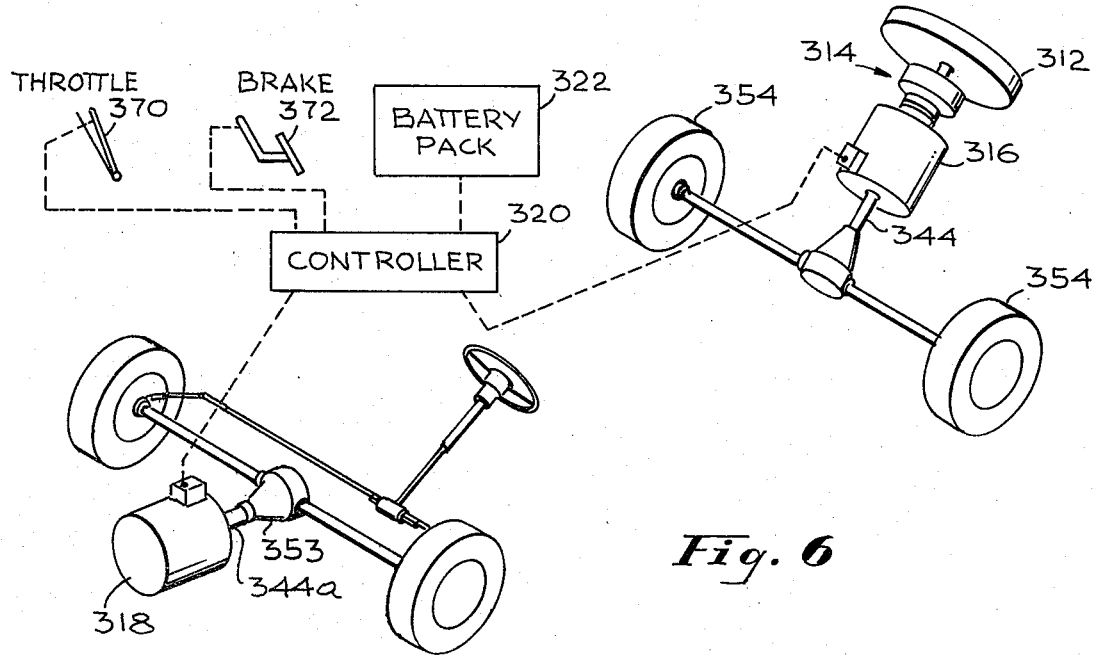
FIG. 6 is a representation of yet another arrangement in accordance with the present invention.

FIG. 6 shows a variation of the invention as heretofore shown and described in which the separate electrical and mechanical torque paths are applied separately to different drive elements of a vehicle instead of being joined to a single output shaft as shown in FIGS. 1, 3 and 4. In FIG. 6, the generator 316 and planetary transmission 314 are as described in connection with FIGS. 4 and 5. The mechanical output shaft 344 is connected to the rear-end differential gear system 352 between the rear drive wheels 354 of the vehicle, while the electrical output is taken from the generator 316 and applied by means of the controller 320 to the traction motor 318, which in this case is connected to a separate output shaft 344a driving a differential gear system 353 coupled to the forward drive wheels 355. As previously described, upon deceleration, the direction of power transfer is in the reverse direction. Maintaining the electrical and mechanical power transmission paths separate all the way to the ultimate drive units provides substantial advantages in the case of four wheel drive vehicles and other applications where separate shaft outputs are desired. If other shaft outputs are desired for other purposes, the separation of power paths as illustrated in FIG. 6 advantageously provides an independence of power transmission paths beyond what is afforded by the arrangements of FIGS. 1, 3 and 4, for example.

Figure 7:
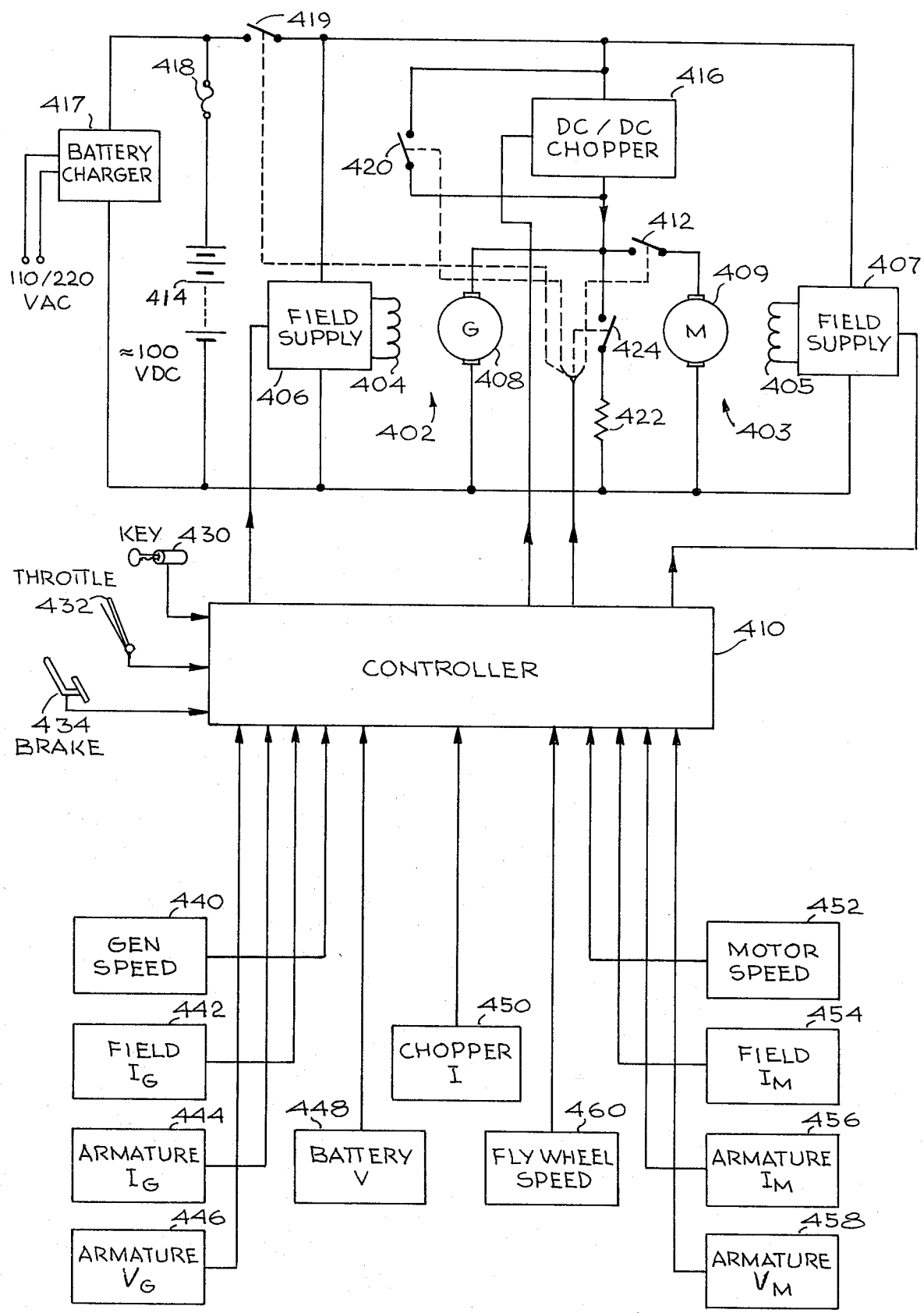
FIG. 7 is a functional block and schematic diagram of the electrical circuitry of arrangements in accordance with the present invention.

FIG. 7 illustrates in combination block and schematic diagram form the operational aspects of the electrical portion of the propulsion system of the present invention. In FIG. 7, a generator 402 and a traction motor 403 are shown of like construction. The generator 402 has a field winding 404 coupled to a field supply unit 406 controlled by a controller 410. The motor 403 has a field winding 405 connected to a field supply 407 also controlled by the controller 410. The armature 408 of the generator 402 and the armature 409 of the motor 403 are connected directly together via a switch 412 and are supplied with current from a battery pack 414 via a DC-to-DC chopper 416 which is controlled from the controller 410. The voltage of the battery pack 414 is approximately 100 volts DC, preferably 108 volts from a pack of 18 individual six-volt batteries. A battery charger 417 is shown for charging the battery pack 414 from AC mains when the vehicle is parked. A fuse or circuit breaker 418 and a line switch 419 are coupled in series with the battery pack 414. Another switch 420 is shown connected across the chopper 416. There is also a dropping or dump resistor 422 in series circuit with a switch 424 across the armatures 408, 409. Switches 412, 419, 420 and 424 are connected to be controlled by the controller 410.

The controller 410 receives operator command inputs from a key switch 430, a throttle pedal 432 and a brake pedal 434. In addition, there are feedback inputs from the various components of the electrical system provided by transducers represented by the blocks in the lower part of the figure providing indications of generator speed 440, generator field current 442, generator armature current 444 and voltage 446, battery voltage 448, chopper current 450, motor speed 452, motor field current 454, motor armature current 456 and voltage 458, and flywheel speed 460.

The control system represented in FIG. 7 is a modification of the previously known Ward Leonard system for the variable speed control of DC motors. In this system, separately excited motors are used and the two armatures are connected directly together. The controller 410 adjusts the relative excitations from the two field supplies 406, 407 to determine the armature current, both in magnitude and direction, in response to the operator command signal from the throttle 432 or brake 434. In the system already developed, the controller 410 is an all-solid-state device with a maximum current requirement of 15 amperes.

In this example, the controller 410 also acts to regulate the current from the battery 414 to be used for cruise power. It receives signals of flywheel speed 460 and traction motor speed 452 and, through the use of suitable algorithms, determines the required battery current to maintain the sum of the vehicle and flywheel kinetic energies at a constant value. Alternatively, the battery current may be controlled as a function of flywheel kinetic energy, for example, or related to other selected variables of the system, as desired. The chopper 416 is used to control current between the battery 414 and the armatures 408, 409 by phase control of the chopper duty cycle. Switch 420 is closed by the controller 410 when it is desired to bypass the chopper 416, as when the flywheel is being powered up by the generator 402 on initial start-up (at which time the switch 412 would be open) or when the flywheel reaches maximum speed on deceleration and the deceleration current is then directed into the battery 414. Switch 424 is closed when a malfunction in the flywheel is detected, thus loading the generator 402 to brake the flywheel.

In one embodiment of the present invention utilizing the electrical system of FIG. 7, the current drawn from the battery pack 414 is controlled at a level equal to the average value for the driving cycle. One benefit of such a control characteristic is the maximization of the usable capacity realized from the battery. Under such a control arrangement, the current from the battery is directed to either or both of the motor and generator armatures, depending upon operating conditions of flywheel and vehicle speed and power demands relative to the operator command signals of throttle and brake.

For example, during spin-up when the flywheel is being brought up to speed initially, all of the current from the battery is directed to the generator which acts as a motor to drive the flywheel. On acceleration, the battery current is directed to the motor armature 409, adding to the current from the generator 408. In the fast cruise mode, the battery current is again directed to the motor armature 409; in this mode, it may be appropriate to drop the generator armature 408 current to zero, so that the system operates on battery current alone. In the slow cruise mode, current from the battery may be directed through both of the generator armature 408 and motor armature 409 under conditions where both machines act as motors. In such a case, the battery supplies the power to propel the vehicle as well as making up the losses in the system, thus maintaining flywheel speed essentially constant. In the deceleration mode in which the motor acts as a generator and the generator acts as a motor, the battery current is directed to the generator armature 408, adding to the current from the motor armature 409 to maximize the deceleration torque. Such control of the average value and direction or distribution of the current from the battery 414 and the direction and magnitude of the currents through the generator armature 408 and motor armature 409 are maintained by the controller 410 in the electrical circuit shown in FIG. 7 by virtue of its control of the field supplies 406, 407 and the chopper 416.

It is also possible that performance can be improved in some cases by cutting off the battery current entirely. The maximum acceleration rate occurs when the maximum current is taken from the generator. If the battery is supplying some of the current to the motor 403, then the current from the generator armature 408 will be reduced and acceleration will be less than maximum. Accordingly, a maximum acceleration mode is provided in which a "kick-down switch" (not shown), which may be associated with the throttle 432 to be activated in the full throttle position, causes the controller to block the current path from the battery in the chopper 416 and to adjust the respective field supplies 406, 407 to develop maximum current in the generator and motor armatures 408, 409. While this produces a maximum acceleration, it results in a penalty in battery capacity, because the average current during the total "on time" of the battery must then be increased to compensate for the time the battery current is cut off by the chopper. Therefore, there is a tradeoff between the maximum acceleration and the effect on available battery capacity.

In some drive systems in accordance with the invention including a flywheel as the prime energy source, it is often desirable, or perhaps even advantageous, to eliminate the dependence on a battery pack as a source of power to drive the system. In such a case, a controller essentially the same as that shown in FIG. 7 except for the inclusion of the chopper 416 is employed. Battery 414, instead of being a large battery pack, may be a simple battery power supply for providing the current needed for the control functions. In operating such a system, the flywheel would be initially powered up to full rpm by an external source. Thereafter, the power to propel the vehicle is divided in the planetary transmission and transferred over the respective electrical and mechanical power transmission paths as heretofore described. The distribution of power over the two separate paths may vary in accordance with load and operating conditions and operator commands. A change of the command signal, either throttle or brake, causes the controller to vary the field supply voltages 406, 407 to change the level of current in the motor and generator armature circuit. Any change in the current in the generator armature is fed back to the planetary transmission to effect a shift in the power and torque transmitted over the respective transmission paths. For example, an acceleration command signal fed to the controller 410 by advancing the throttle 432 (FIG. 7) causes the controller 410 to vary the field supplies 406, 407 to produce increased current in the armatures 408, 409. This increased current develops additional torque in the traction motor 403 and also causes the generator 402 to develop increased resistance to rotation by the planetary transmission. This serves to load the associated flywheel so that additional torque is transmitted over the mechanical transmission path, thereby increasing the torque delivered by the mechanical transmission path in addition to the increased torque developed by the traction motor in the electrical transmission path.

A system including a battery pack as heretofore described operates in similar fashion except that the addition of the battery current under the control of the controller 410 provides a further degree of sophistication in system operation and control, as already explained.

With the utilization of vehicle propulsion systems in accordance with the present invention, substantial advances are realized in efforts to achieve a pollution-free, energyconserving vehicle serving a substantial portion of modern driving needs. A large part of the vehicle kinetic energy which is lost during deceleration by conventional, friction-type braking systems and dissipated as heat is conserved in the present system. This energy is then available in the flywheel for accelerating and propelling the vehicle. Driving losses are made up from the battery and some of the kinetic energy on deceleration may be stored in the battery if the maximum kinetic energy of the flywheel is reached. Further economies are realized from the system of the present invention through reduction of weight and size of the electrical drive components over those of a conventional flywheel and all-electric transmission system by virtue of the split path, electromechanical transmission which is employed.

Although there have been described above specific arrangements of a flywheel propulsion system having a split electromechanical transmission in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A combination electromechanical drive system utilizing a flywheel as the principal power source, comprising:
    a flywheel mounted for rotation within a housing and having a shaft connected thereto;
    a differential planetary transmission having a sun gear, a plurality of planet gears coupled to a carrier, and a ring gear together with first, second and third terminals, the first terminal being coupled directly to the flywheel shaft;
    a first output shaft coupled to the second terminal in a first mechanical power transmission path; and
    a second electrical power transmission path comprising first and second motor/generator machines electrically connected together with a controller to control the amount of electric power transmitted thereby, the first machine being mechanically coupled to the planetary transmission third terminal and the second machine having a second output shaft for transmitting rotary mechanical power.

2. The system of claim 1 wherein the first machine has a rotatable shaft mechanically coupled to the planetary transmission ring gear.

3. The system of claim 1 wherein the sun gear constitutes the first terminal, the planet gear carrier is the second terminal and the ring gear is the third terminal.

4. The system of claim 1 wherein the first output shaft is connected to drive one set of drive wheels of a vehicle and the second output shaft is connected to drive another set of drive wheels of the vehicle.

5. The system of claim 1 wherein the second output shaft is mechanically coupled to the first output shaft to combine the power transferred over said electrical and mechanical transmission paths.

6. The system of claim 5 wherein the second machine is mounted with its shaft in line with and mechanically coupled to the first output shaft.

7. The system of claim 1 wherein the first machine is coaxially mounted relative to the first output shaft.

8. The system of claim 7 wherein the first machine includes an armature adapted for rotation relative to the first output shaft, the armature having an extension surrounding the carrier and directly coupled to the ring gear.

9. The system of claim 1 further including a battery connected to the controller, the controller being selectively operable to transfer current between the battery and said first and second machines.

10. The system of claim 9 wherein the controller is selectively operable to transfer current from the battery to the first machine to drive the flywheel.

11. The system of claim 9 wherein the controller is selectively operable to transfer current from the battery to the second machine to drive the second output shaft.

12. The system of claim 9 wherein the controller is selectively operable to transfer current from the second machine to the battery during deceleration of the second output shaft.

13. The system of claim 9 as employed in propelling a vehicle wherein the first output shaft is connected to drive one set of drive wheels of the vehicle and the second output shaft is connected to drive another set of drive wheels of the vehicle and further including means for applying to the controller signals indicative to flywheel speed and second machine speed, the controller including means for maintaining the sum of the vehicle and flywheel kinetic energies constant in the cruise mode of vehicle operation.

14. The system of claim 9 further including means for applying command input signals to the controller and means for applying feedback signals from the first and second machines to the controller to cause transmission of power over the first and second transmission paths in response to the command input signals.

15. A split electromechanical power transmission system for operation on kinetic energy stored in a flywheel as the principal power source, comprising:
    a rotatable flywheel for storing kinetic energy;
    a differential planetary transmission for dividing power between a first mechanical power transmission path and a second electrical power transmission path; the transmission including a first terminal coupled directly to the flywheel, a second terminal coupled to a first output shaft in said mechanical power transmission path, and a third terminal coupled to a generator for generating current for application to a motor connected in said electrical power transmission path and having a second output shaft; and a controller for controlling the division of power between the electrical and the mechanical power transmission paths.

16. The system of claim 15 wherein said first and second power transmission paths have the capability of transmitting power in either of two opposite directions between the flywheel and the respective first and second output shafts.

17. The system of claim 16 wherein said motor is adapted to act as a generator for generating current for application to the generator, and said generator is adapted to act as a motor to drive the third terminal for transmitting power from the second output shaft to the transmission.

18. The system of claim 15 further including a battery as an auxiliary energy storage element and wherein said controller includes means for controlling current between the battery and the electrical power transmission path.

19. The system of claim 15 further including a battery as an auxiliary energy storage element and wherein said controller further includes means for controlling current from the battery to the generator to cause the generator to act as a motor and drive the planetary transmission and thereby drive the flywheel to store kinetic energy therein.

20. A vehicle propulsion system comprising:
a rotatable flywheel mounted on a shaft and constituting the principal power source for the system;
a differential planetary transmission having a first terminal coupled directly to the flywheel shaft, a second terminal and a third terminal;
a mechanical power transmission path comprising a first drive shaft coupled to the second terminal;
an electrical power transmission path comprising first and second motor/generator machines, each having a rotatable armature, the armatures being electrically connected together for transfer of current therebetween, the armature of the first machine being mechanically coupled to the third terminal of the planetary transmission and the armature of the second machine having a second drive shaft for transmitting rotary mechanical power;
means for controlling the direction and magnitude of current from one armature to the other; and
means for connecting said first and second drive shafts to drive the vehicle.

21. The system of claim 20 wherein the transmission comprises a sun gear coupled to the first terminal, a plurality of planet gears mounted on a carrier coupled to the second terminal, and ring gear coupled to the third terminal, and wherein the mechanical power transmission path further includes the planet gears and carrier.

22. The system of claim 20 wherein said vehicle has at least two sets of drive wheels and the connecting means include means for connecting the first drive shaft to one set of drive wheels and the other drive shaft to the other set of drive wheels.

23. The system of claim 20 wherein the connecting means includes means connecting the first and second drive shafts together to drive the vehicle.

24. The system of claim 20 wherein said controlling means includes means for controlling the armature current, thereby affecting the division of power between the electrical and mechanical transmission paths, in accordance with flywheel speed, vehicle speed and operator command signals during operation over the speed range of the vehicle.

25. The system of claim 22 further including a battery pack coupled to the electrical power transmission path, the controlling means also being operative to control the magnitude and distribution of battery current to the machine armatures.

26. The system of claim 25 wherein the controlling means includes means for cutting off current from the battery to the electrical power transmission path to increase acceleration of the vehicle upon receipt of a maximum acceleration command signal.

27. The method of controlling the transmission of power in a vehicle propulsion system between a flywheel rotating as a source of stored kinetic energy constituting the principal power source in the system and the drive wheels of the vehicle comprising the steps of:
initially driving the flywheel to an elevated rotational speed while maintaining the vehicle drive system stationary in order to store kinetic energy in the flywheel for sustained operation of the vehicle;
dividing the power from the flywheel between an electrical transmission path and a mechanical transmission path by means of a differential transmission coupled directly to the flywheel;
controlling the electric current in the electrical transmission path in order to determine the power transmitted thereby from the flywheel to the vehicle drive wheels in response to operator command signals and the system feedback signals and thereby determine the amount of power transmitted over the mechanical transmission path; and
applying the power from the electrical transmission path and the mechanical transmission path to propel the vehicle.

28. The method of claim 27 wherein the power applying step comprises applying power from the mechanical transmission path to a first set of vehicle wheels and applying power from the electrical transmission path to a separate vehicle drive system.

29. The method of claim 27 further including controlling the electrical current in the electrical transmission path in response to operator command signals during deceleration of the vehicle in order to drive the flywheel to increase the kinetic energy stored therein.

30. The method of claim 29 further including the step of controlling current from an associated electric battery to the electrical transmission path to combine with power taken from the flywheel in propelling the vehicle.

* * * * *